(12) United States Patent
Miller

(10) Patent No.: US 8,650,952 B1
(45) Date of Patent: Feb. 18, 2014

(54) CALIBRATED MEASURING DEVICE FOR MEDICAMENTS

(71) Applicant: Megan Miller, Bradenton, FL (US)

(72) Inventor: Megan Miller, Bradenton, FL (US)

(73) Assignee: Megan Miller, Bradenton, FL (US)

( * ) Notice: Subject to any disclaimer, the term of this patent is extended or adjusted under 35 U.S.C. 154(b) by 0 days.

(21) Appl. No.: 13/648,123

(22) Filed: Oct. 9, 2012

(51) Int. Cl.
G01F 19/00 (2006.01)

(52) U.S. Cl.
USPC .................................. 73/426; 73/427

(58) Field of Classification Search
USPC .................................. 73/426, 427
See application file for complete search history.

(56) References Cited

U.S. PATENT DOCUMENTS

| | | | | |
|---|---|---|---|---|
| 2,165,642 A | * | 7/1939 | Mayer | 73/429 |
| 2,603,093 A | * | 7/1952 | Cordova | 73/427 |
| D234,039 S | * | 1/1975 | Lutzker | D10/46.2 |
| 4,043,203 A | * | 8/1977 | Montesi | 73/427 |
| 5,377,879 A | * | 1/1995 | Isaacs | 222/205 |

\* cited by examiner

*Primary Examiner* — Lisa Caputo
*Assistant Examiner* — Jamel Williams
(74) *Attorney, Agent, or Firm* — Morgan, Lewis & Bockius LLP

(57) ABSTRACT

A spoon comprises a handle and a bowl. The bowl has a superior face and an inferior face. The bowl includes a front tip-end portion, a rear handle-end portion and a central axis. The bowl includes a first outer edge and a second outer edge, each having a respective length. The bowl includes a first curved side and a second curved side each upturned toward the superior face of the bowl thereby forming a concave arcuate enclosure for an elongated receptacle formed substantially along a portion of the central axis and tapering toward the front tip-end portion. The first curved side and the second curved side terminate at a predefined distance respectively along the first outer edge and the second outer edge from an apex of the rear handle-end portion thereby causing the rear handle-end portion to be flat relative to the first curved side and the second curved side.

19 Claims, 4 Drawing Sheets

CALIBRATED MEASURING DEVICE FOR MEDICAMENTS

TECHNICAL FIELD

The disclosed embodiments relate generally to a spoon and specifically to a spoon with a bowl having curved sides that enclose a receptacle configured to contain medicaments (e.g., medication, vitamins).

BACKGROUND

Vitamins are essential nutrients that provide nourishment to the human body and sustenance for several physiological processes occurring in the human body. Although vitamins occur naturally in balanced diets that are rich in a variety of fruits and vegetables, there is frequently a need to supplement the naturally occurring vitamins through dietary supplements (such as vitamin pills and powders). A convenient way to consume water-soluble powdered vitamin supplements at regular intervals through the day is by adding and dissolving the vitamin powder in drinking water (e.g., stored in water bottles). Vitamins, in powder form, may be added to the drinking water in water bottles using utensils such as spoons.

Commonly occurring spoons used for household purposes have shallow bowls that are inadequate in shape and volume for containing vitamin powder or other medicaments without spillage. It would be beneficial to have spoons with curved edges along the bowls that form a receptacle to contain the vitamin powder so that the vitamin powder can be added to a water bottle without spillage of the powder during the process of dispensing the powder into the bottles.

Spoons with curved edges have been described in various patents. For example, U.S. Pat. No. D284,894 entitled 'Medicament Dispenser Spoon' describes an ornamental design for a medicament dispenser spoon.

As another example, U.S. Pat. No. 4,524,513 entitled 'Flat Tip Spoon' describes a spoon with a bowl with a rearwardly extending handle and a forwardly extending flat tip end area portion. Furthermore, the spoon described in this patent includes convexly arcuate side edges of the bowl which merge with and terminate a substantial distance rearwardly from the forward portion of the flat tip end area portion.

While these spoons provide receptacles for material (e.g., medication, vitamins and the like) directed thereinto, they do not possess the necessary shape and dimensions to dispense medicaments by direct introduction of the spoons into narrow-rimmed containers (such as water bottles) so as to minimize spillage of the material. Accordingly, what is needed in the art are improved spoons for medicament handling.

SUMMARY

The present disclosure addresses the need in the art by providing improved medicament (e.g., medications, vitamins, etc.) dispenser spoons that have curved edges along a substantial length of the sides of the bowl forming an elongated receptacle that tapers toward the front tip of the bowl and dispenses material by direct introduction of the receptacle into narrow rimmed containers without spillage of the contained material from the sides of the bowl.

Disclosed are spoons that provide the necessary shape and dimensions so as to enable their tapering receptacles to be introduced into the narrow rims of bottles in order to dispense material directly into the bottles so as to minimize spillage of the material contained within the receptacles. The disclosed spoons address the need for containing vitamins and subsequently introducing the vitamins directly into the narrow rims of water bottles while minimizing or eliminating medicament spillage.

In accordance with some embodiments, a spoon for dispensing material into a narrow-rimmed container comprises a handle having a first end and a tapered second end. The spoon further comprises a bowl having a superior face and an inferior face.

The bowl includes (i) a front tip-end portion, (ii) a rear handle-end portion, and (iii) a central axis. The central axis connects an apex of the front tip-end portion to an apex of the rear handle-end portion. The apex of the rear handle-end portion is connected to the second end of the handle. The front tip-end portion is narrower than the rear handle-end portion.

The bowl further includes a first outer edge and a second outer edge, each of which has a respective length and each of which connects the apex of the front tip-end portion to the apex of the rear handle-end portion of the bowl along the respective length. The first outer edge and the second outer edge are formed symmetrically around the central axis of the bowl.

The bowl further includes a first curved side and a second curved side. The first curved side is bounded by a subset of the length of the first outer edge of the bowl. The second curved side is bounded by a subset of the length of the second outer edge of the bowl. The first curved side and the second curved side are each upturned toward the superior face of the bowl thereby forming a concave arcuate enclosure for an elongated receptacle formed substantially along a portion of the central axis of the bowl midway between the apex of the front tip-end and rear handle-end portion.

An apex of the first curved side is partially folded over upon a lower portion of the first curved side. An apex of the second curved side is partially folded over upon a lower portion of the second curved side. The first curved side terminates at a predefined distance along the first outer edge from the apex of the rear handle-end portion and the second curved side terminates at the predefined distance along the second outer edge from the apex of the rear handle-end portion thereby causing the rear handle-end portion to be flat relative to the first curved side and the second curved side. The front-tip end is characterized by a flat arcuate region.

The elongated receptacle has a first dimension proximal to the front tip-end portion and a second dimension proximal to the rear tip-end portion. The first dimension and the second dimension are each defined along an axis orthogonal, or nearly orthogonal, to the central axis of the bowl. The first dimension is smaller than the second dimension thereby tapering the elongated receptacle toward the front tip-end portion.

The receptacle formed within the concave arcuate enclosure is configured to contain material and to direct the contained material toward the front tip-end portion.

BRIEF DESCRIPTION OF THE DRAWINGS

Like reference numerals refer to corresponding parts throughout the drawings.

DESCRIPTION OF EMBODIMENTS

Figure 1:
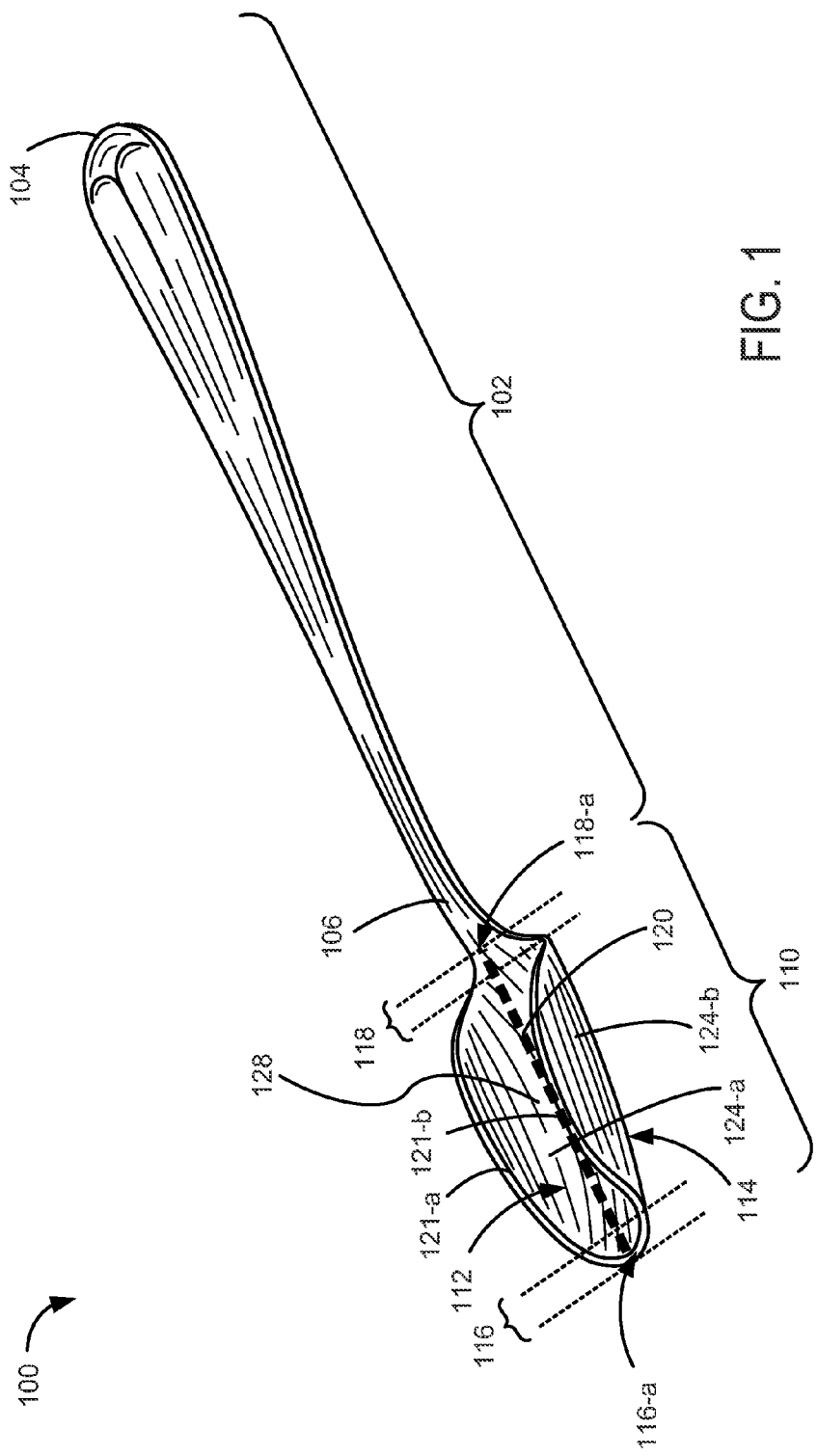
FIG. 1 is a perspective view of a spoon, in accordance with some embodiments.

FIG. 1 is a perspective view of spoon 100, in accordance with some embodiments. As shown in FIG. 1, spoon 100 comprises handle 102 and bowl 110.

In some embodiments, spoon 100 is made of a solid homogenous material selected from the group consisting of: a plastic, a metal, and a metal alloy. In some embodiments, spoon 100 is plated with a metal (e.g., gold, silver, pewter, copper, alloys thereof, and combinations thereof). In some embodiments, spoon 100 is carved from wood. In some embodiments, spoon 100 is made of stainless steel, aluminum, or an aluminum alloy. In some embodiments, spoon 100 has a mass of less than fifty, forty, thirty, twenty-five, twenty, fifteen, ten or five grams.

Handle 102 has first end 104 and tapered second end 106. In some embodiments, a width of first end 104 is greater than a width of tapered second end 106. In some embodiments, a width of first end 104 is less than a width of second end 106, thereby resulting in handle 102 tapering toward first end 104, rather than toward second end 106. In some embodiments, a width of first end 104 is substantially equal to a width of second end 106, resulting in handle 102 having a substantially uniform width across a length of handle 102. In some embodiments, handle 102 has a substantially flat cross-section across all or a portion of the length of handle 102. In alternative embodiments, handle 102 has a substantially cylindrical shape with a substantially circular cross-section along a length of handle 102. In some embodiments, first end 104 of handle 102 is used to hold spoon 100 and maneuver spoon 100 to direct material (e.g., medication, vitamins and the like) into bowl 110 and subsequently out of bowl 110 into a narrow-rimmed container. In some embodiments, handle 102 has a length of between 8 centimeters and 10 centimeters. In some embodiments, handle 102 has a length of between 4 centimeters and 40 centimeters, between 6 centimeters and 30 centimeters, or between 2 centimeters and 20 centimeters. In some embodiments, handle 102 has a width of between 0.3 centimeters and 2.0 centimeters. It should be understood that the shapes and/or dimensions of handle 102 described are merely illustrative and representative; handle 102 described herein can be designed to have shapes and/or dimensions not specifically listed here. The illustrative shapes and/or dimensions described are not intended to be exhaustive or to limit the design of handle 102 to the precise forms disclosed. Many modifications and variations are possible in view of the above teachings, as would be clear to persons of ordinary skill in the art.

In some embodiments, the first end 104 comprises a hole for receiving a ring, wherein the ring adjoins spoon 100 to another utensil. For example, the ring adjoins spoon 100 to one or more other spoons and/or to a plate and/or to a cup and/or to a narrow-rimmed container which holds drinking water.

Bowl 110 has superior face 112 and inferior face 114. Bowl 110 further includes front tip-end portion 116, rear handle-end portion 118 and central axis 120. Central axis 120 is bounded by the apex of the front tip-end portion (116-a) and an apex of the rear handle-end portion (118-a). In some embodiments, a ratio between a length of handle 102 and a length of central axis 120 connecting apex of front tip-end portion 116-a of bowl 110 to apex of rear handle-end portion 118-a of bowl 110 is between 1.7 and 2.2. For example, if the length of central axis 120 connecting apex of front tip-end portion 116-a of bowl 110 to apex of rear handle-end portion 118-a of bowl 110 is 10 centimeters, then the length of handle 102 is between 17 centimeters and 22 centimeters. As another example, if the length of central axis 120 connecting apex of front tip-end portion 116-a of bowl 110 to apex of rear handle-end portion 118-a of bowl 110 is 5 centimeters, then the length of handle 102 is between 8.5 centimeters and 11 centimeters.

Apex of rear handle-end portion 118-a is connected to second end 106 of handle 102. Front tip-end portion 116 is narrower than rear handle-end portion 118. For example, front tip-end portion 116 has a smaller perimeter than rear handle-end portion 118. As another example, front tip-end portion 116 has a smaller radius of curvature than rear handle-end portion 118. As yet another example, front tip-end portion 116 has a smaller area than rear handle-end portion 118. Front tip-end portion 116 is characterized by a flat region bounded by an arcuate edge.

Bowl 110 further includes first outer edge 121-a and second outer edge 121-b, each having a respective length 122 (as explained in greater detail with reference to FIG. 3 below). First outer edge 121-a and second outer edge 121-b each connect the apex of front tip-end portion 116-a to the apex of rear handle-end portion 118-a of bowl 110 along the respective lengths 122. First outer edge 121-a and second outer edge 121-b are formed symmetrically (e.g., substantially symmetrically) around central axis 120 of bowl 110.

Bowl 110 further includes first curved side 124-a and second curved side 124-b. First curved side 124-a is bounded by a subset of the length 122 of first outer edge 121-a of bowl 110 and second curved side 124-b is bounded by a subset of the length 122 of second outer edge 121-b of bowl 110. For example, a length of first curved side 124-a is less than the length 122 of first outer edge 121-a of bowl 110 while a length of second curved side 124-b is less than the length 122 of second outer edge 121-b of bowl 110. In some embodiments, first curved side 124-a and second curved side 124-b each has a length of between 4 centimeters and 6 centimeters. In some embodiments, first curved side 124-a and second curved side 124-b each has a length of between 2 centimeters and 8 centimeters.

First curved side 124-a and second curved side 124-b are each upturned toward superior face 112 of bowl 110 thereby forming concave arcuate enclosure 128 for an elongated receptacle formed substantially along a portion of central axis 120 of bowl 110 midway between the apex of front tip-end 116-a and the apex of rear handle-end portion 118-a. The receptacle formed within concave arcuate enclosure 128 is configured to contain material (e.g., medication, vitamins and the like) and to direct the contained material toward front tip-end portion 116. For example, the receptacle formed within concave arcuate enclosure 128 is configured to be introduced into a narrow-rimmed bottle to dispense the material contained therein (e.g., medication, vitamins and the like) directly into a narrow-rimmed container, such as a bottle (e.g., without spillage of the material).

In some embodiments, spoon 100 includes a visual indication of a volume of bowl 110. In some embodiments, the visual indication comprises an engraving on a surface (e.g., on superior face 112 and/or on inferior face 114) of bowl 110 indicating the volume of bowl 110. In some embodiments, a visual indication of the volume of bowl 110 indicates a measure of the maximum volume of material that can be contained in the receptacle formed within concave arcuate enclosure 128. For example, a visual indication of the volume of bowl 110 corresponds to the word 'Teaspoon' engraved on a surface of bowl 110. As another example, a visual indication of the volume of bowl 110 corresponds to the word 'Tablespoon' engraved on a surface of bowl 110. As yet another example, a visual indication of the volume of bowl 110 corresponds to the metric volume 4.93 mL (e.g., corresponding to the volume of a teaspoon) engraved on a surface of bowl 110. As yet another example, a visual indication of the volume of bowl 110 corresponds to the metric volume 15 mL (e.g., corresponding to the volume of a tablespoon) engraved on a surface of bowl 110. It should be understood that the volumes of bowl 110 described are merely illustrative and representative; bowl 110 described herein can be designed to have volumes not specifically listed here.

Figure 2:
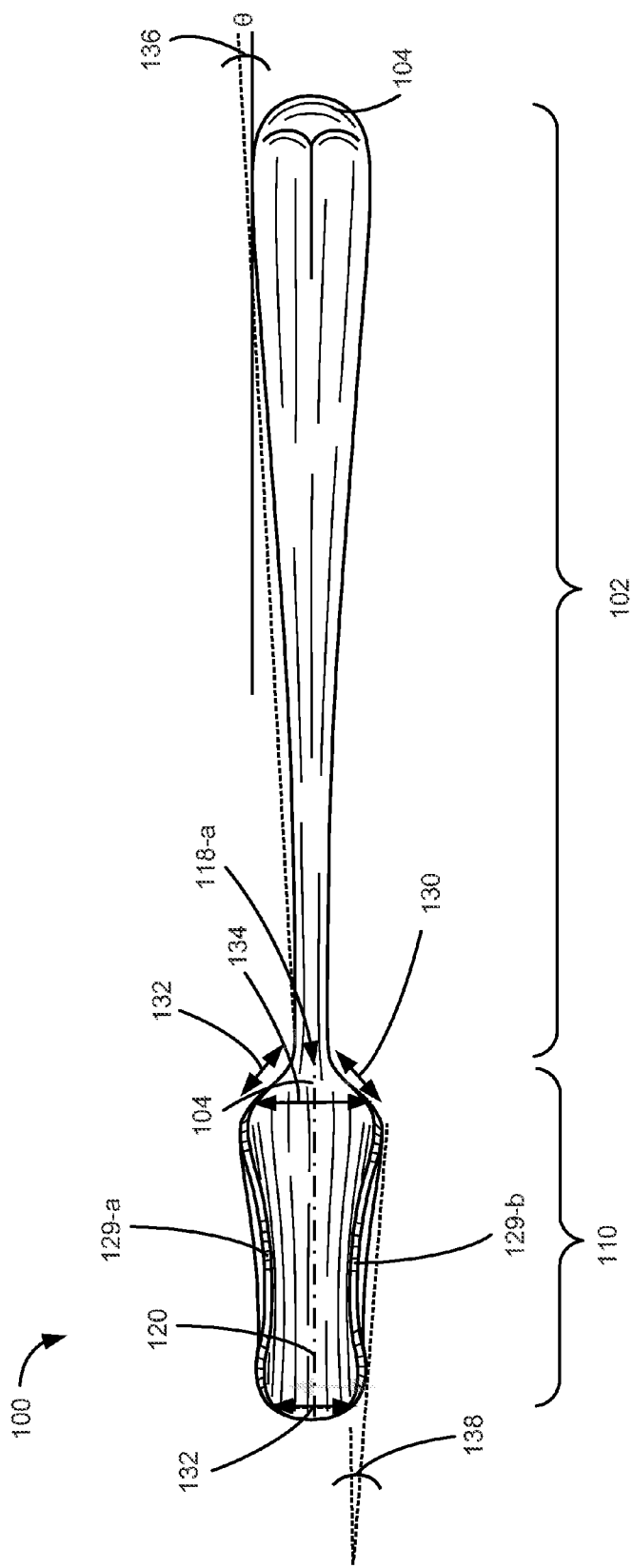
FIG. 2 is a top view of the spoon, in accordance with some embodiments.

FIG. 2 is a top view of spoon 100, in accordance with some embodiments. Accordingly, shown in FIG. 2 is a top view of handle 102 and bowl 110 of spoon 100. In some embodiments, handle 102 has first angle of taper 136 between the first end 104 and the tapered second end 106 of handle 102 of between 1 degree and 10 ten degrees, between 0.5 degree and 5 degrees, or between 0.4 degrees and 3 degrees. As noted previously, in some embodiments, a width of first end 104 is less than a width of second end 106, thereby resulting in handle 102 tapering toward first end 104, rather than toward second end 106 (e.g., at first angle of taper 136).

As explained with reference to FIG. 1, bowl 110 includes a first curved side (e.g., first curved side 124-a, FIG. 1) and a second curved side (e.g., second curved side 124-b, FIG. 1). As shown in FIG. 2, the apex of first curved side 129-a (e.g., corresponding to an apex of first curved side 124-a, FIG. 1) is partially folded over upon a lower portion of the first curved side (e.g., first curved side 124-a, FIG. 1). The apex of second curved side 129-b (e.g., corresponding to an apex of second curved side 124-b, FIG. 1) is partially folded over upon a lower portion of the second curved side (e.g., second curved side 124-b, FIG. 1).

The first curved side (e.g., first curved side 124-a, FIG. 1) terminates at a predefined distance (e.g., predefined distance 130) along the first outer edge (e.g., first outer edge 121-a, FIG. 1) from apex of rear handle-end portion 118-a. Moreover, the second curved side (e.g., second curved side 124-b, FIG. 1) terminates at the predefined distance 132 along the second outer edge (e.g., second outer edge 121-b, FIG. 1) from apex of rear handle-end portion 118-a. As a result, the rear handle-end portion (e.g., rear handle-end portion 118, FIG. 1) is flat relative to the first curved side (e.g., first curved side 124-a, FIG. 1) and the second curved side (e.g., second curved side 124-b, FIG. 1). In some embodiments, central axis 120 connecting the apex of front tip-end portion 116-a to the apex of rear handle-end portion 118-a has a length of between 4 and 6 centimeters and predefined distance 130/132 is between 0.5 centimeters and 2.0 centimeters. In some embodiments, a ratio of a length of central axis 120 to predefined distance 130 is between 4.5 and 6. For example, if predefined distance 130 is 1 centimeter, then the length of central axis 120 is between 4.5 centimeters and 6 centimeters. In preferred embodiments, lengths 130 and 132 are the same.

The elongated receptacle has a first dimension 132 proximal to the front tip-end portion (e.g., front tip-end portion 116, FIG. 1) and second dimension 134 proximal to the rear handle-end portion (e.g., rear handle-end portion 118, FIG. 1). First dimension 132 and second dimension 134 are each defined along an axis orthogonal to central axis 120 of the bowl 110. First dimension 132 is smaller than second dimension 134 thereby tapering the elongated receptacle toward the front tip-end portion (e.g., front tip-end portion 116, FIG. 1). In some embodiments, the tapered elongated receptacle formed within concave arcuate enclosure 128 is configured in shape and/or dimensions so as to be introduced into a narrow-rimmed bottle to dispense the material contained therein (e.g., medication, vitamins and the like) into a narrow-rimmed container, such as a bottle (e.g., without spillage of the material). Accordingly, in some embodiments, a ratio of second dimension 134 to first dimension 132 of the elongated receptacle is between 1.5 and 2. For example, if first dimension 132 is 1 centimeter, then second dimension 134 is between 1.5 centimeters and 2 centimeters. In some embodiments, the elongated receptacle is tapered toward the front tip-end portion (e.g., front tip-end portion 116, FIG. 1) at second angle of taper 138 of between 2 degrees and 10 degrees. In some embodiments, second angle of taper 138 is measured relative to central axis 120 of bowl 110.

Figure 3:
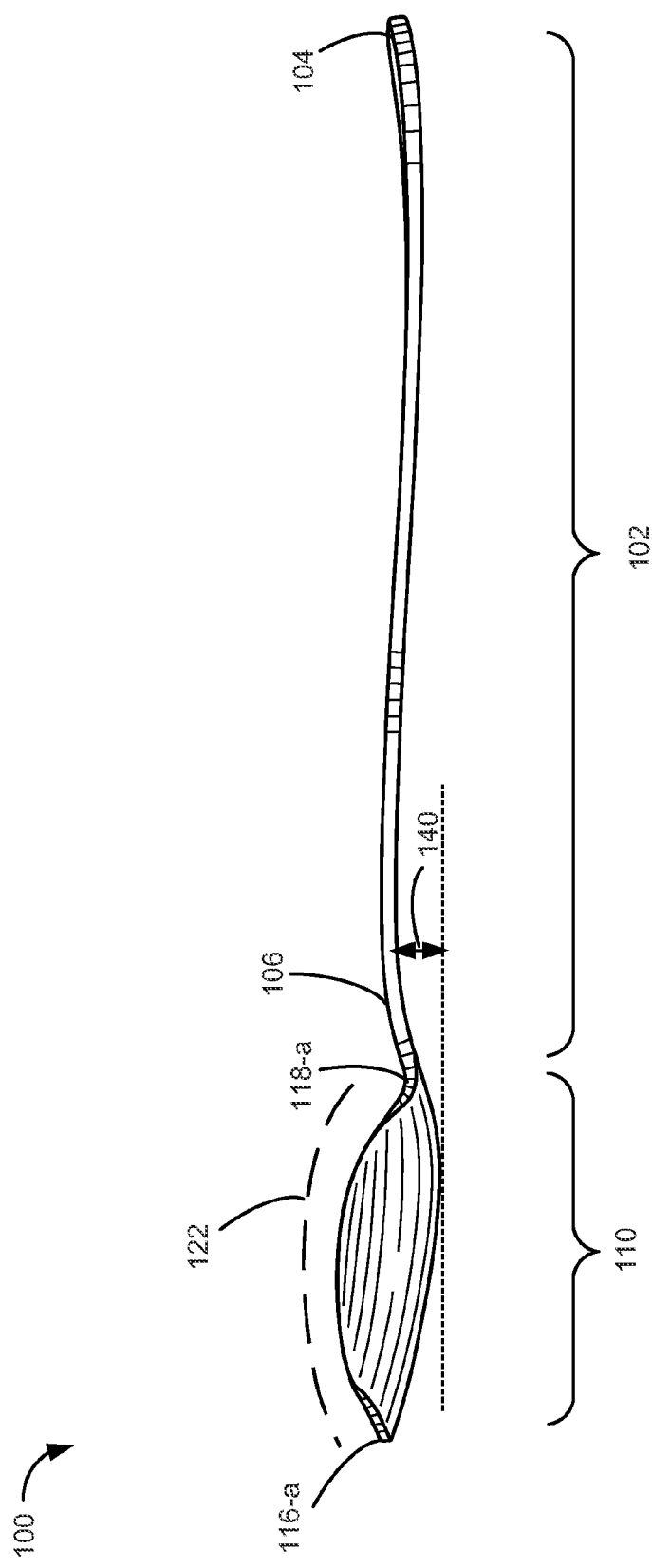
FIG. 3 is a first side view of the spoon, in accordance with some embodiments.
Figure 4:
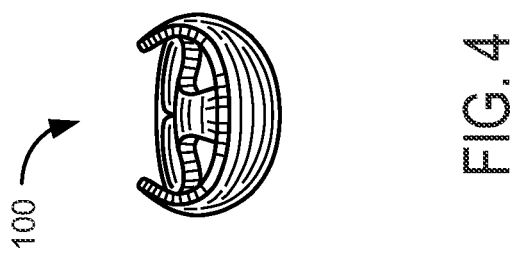
FIG. 4 is a second view of the spoon, in accordance with some embodiments.

FIG. 3 is a side view of spoon 100, in accordance with some embodiments. Accordingly, shown in FIG. 3 is a side view of handle 102 and bowl 110 of spoon 100.

First outer edge 121-a (FIG. 1) and second outer edge 121-b (FIG. 1), each has a respective length 122 (as shown in FIG. 3). Further, as shown in FIG. 3, first outer edge 121-a and second outer edge 121-b each connect the apex of front tip-end portion 116-a to the apex of rear handle-end portion 118-a of bowl 110 along the respective length 122.

In some embodiments, the apex of the rear handle-end portion (e.g., apex of rear handle end portion 118-a, FIG. 1) is connected to the second end (e.g., second end 106, FIG. 1) of handle 102 at an arcuate joint elevated to predefined height 140 of between 0.2 centimeters and 1 centimeter from the portion of the central axis (e.g., central axis 120, FIGS. 1-2) of bowl 110 midway between the apex of the front tip-end (e.g., apex of front tip-end portion 116-a) and rear handle-end portion (e.g., apex of rear handle end portion 118-a).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A spoon for dispensing material into a narrow-rimmed container, the spoon comprising:

a handle having a first end and a tapered second end; and a bowl, said bowl having a superior face and an inferior face;

wherein said bowl further includes (i) a front tip-end portion, (ii) a rear handle-end portion, and (iii) a central axis, the central axis connecting an apex of the front tip-end portion to an apex of the rear handle-end portion, the apex of the rear handle-end portion connected to said second end of said handle and the front tip-end portion being narrower than the rear handle-end portion;

wherein said bowl further includes a first outer edge and a second outer edge, each having a respective length and each connecting the apex of the front tip-end portion to the apex of the rear handle-end portion of the bowl along the respective length, the first outer edge and the second outer edge formed symmetrically around the central axis of the bowl;

wherein said bowl further includes a first curved side and a second curved side, the first curved side bounded by a subset of the length of the first outer edge of the bowl and the second curved side bounded by a subset of the length of the second outer edge of the bowl, the first curved side and the second curved side each being upturned toward the superior face of the bowl thereby forming a concave arcuate enclosure for an elongated receptacle formed substantially along a portion of the central axis of the bowl midway between the apex of the front tip-end and rear handle-end portion;

wherein an apex of the first curved side is partially folded over upon a lower portion of the first curved side;

wherein an apex of the second curved side is partially folded over upon a lower portion of the second curved side;

wherein the first curved side terminates at a predefined distance along the first outer edge from the apex of the rear handle-end portion and the second curved side terminates at the predefined distance along the second outer edge from the apex of the rear handle-end portion thereby causing the rear handle-end portion to be flat relative to the first curved side and the second curved side, wherein the front-tip end is characterized by a flat arcuate region;

wherein the elongated receptacle has a first dimension proximal to the front tip-end portion and a second dimension proximal to the rear handle-end portion, the first dimension and the second dimension each defined along an axis orthogonal to the central axis of the bowl, the first dimension being smaller than the second dimension thereby tapering the elongated receptacle toward the front tip-end portion; and wherein the receptacle formed within the concave arcuate enclosure is configured to contain material and to direct the contained material toward the front tip-end portion.

2. The spoon of claim 1, wherein the spoon is made of a solid homogenous material selected from the group consisting of: a plastic, a metal, and a metal alloy.

3. The spoon of claim 1, wherein the handle has a length of between 8 centimeters and 10 centimeters, a width of between 0.3 centimeters and 2.0 centimeters, and a first angle of taper between the first end and the tapered second end of the handle of between 1 degree and 10 degrees.

4. The spoon of claim 1, wherein the central axis connecting the apex of the front tip-end portion to the apex of the rear handle-end portion has a length of between 4 and 6 centimeters and the predefined distance from the apex of the rear handle-end portion is between 0.5 centimeters and 2.0 centimeters.

5. The spoon of claim 1, wherein a ratio between a length of the handle and a length of the central axis connecting the apex of the front tip-end portion of the bowl to the apex of the rear handle-end portion of the bowl is between 1.7 and 2.2.

6. The spoon of claim 1, wherein a ratio of a length of the central axis to the predefined distance from the apex of the rear handle-end portion is between 4.5 and 6.

7. The spoon of claim 1, wherein a ratio of the second dimension to the first dimension of the elongated receptacle is between 1.5 and 2.

8. The spoon of claim 1, wherein the elongated receptacle is tapered toward the front tip-end portion at a second angle of taper of between 2° and 10°.

9. The spoon of claim 1, wherein the first curved side and the second curved side each has a length of between 4 centimeters and 6 centimeters.

10. The spoon of claim 1, wherein the apex of the rear handle-end portion is connected to the second end of the handle at an arcuate joint elevated to a predefined height of between 0.2 centimeters and 1 centimeter from the portion of the central axis of the bowl midway between the apex of the front tip-end and rear handle-end portion.

11. The spoon of claim 1, wherein the spoon is plated with a metal.

12. The spoon of claim 11, wherein the metal is gold, silver or pewter.

13. The spoon of claim 1, wherein the spoon is made of stainless steel or aluminum.

14. The spoon of claim 1, wherein the first end comprises a hole for receiving a ring, wherein the ring adjoins the spoon to another utensil.

15. The spoon of claim 1, wherein the spoon has a mass of less than twenty grams.

16. The spoon of claim 1, wherein the spoon has a mass of less than five grams.

17. The spoon of claim 1, wherein the spoon is carved from wood.

18. The spoon of claim 1, wherein the spoon includes a visual indication of a volume of the bowl.

19. The spoon of claim 18, wherein the visual indication comprises an engraving on a surface of the bowl indicating the volume of the bowl.

\* \* \* \* \*